(12) United States Patent
Patel et al.

(10) Patent No.: US 7,312,183 B2
(45) Date of Patent: Dec. 25, 2007

(54) SHALE HYDRATION INHIBITION AGENT AND METHOD OF USE

(75) Inventors: Arvind D. Patel, Sugarland, TX (US); Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 413 days.

(21) Appl. No.: 10/958,635

(22) Filed: Oct. 5, 2004

(65) Prior Publication Data

US 2006/0073982 A1    Apr. 6, 2006

(51) Int. Cl.
*C09K 8/035* (2006.01)
(52) U.S. Cl. .................. 507/129; 507/239; 507/248
(58) Field of Classification Search ............... 507/129, 507/239, 248
See application file for complete search history.

(56) References Cited

U.S. PATENT DOCUMENTS

| | | | | |
|---|---|---|---|---|
| 2,761,842 | A | * | 9/1956 | Brown et al. ............... 507/248 |
| 3,981,766 | A | * | 9/1976 | Pechhold .................... 162/161 |
| 4,561,985 | A | * | 12/1985 | Glass, Jr. .................... 507/108 |
| 4,666,613 | A | * | 5/1987 | Schapira et al. ............ 507/129 |
| 5,190,683 | A | * | 3/1993 | Evain et al. .................. 252/60 |

* cited by examiner

*Primary Examiner*—Kuo-Liang Peng

(57) ABSTRACT

A water-base fluid for use in drilling, cementing, workover, fracturing and abandonment of subterranean wells through a formation containing shale which swells in the presence of water. In one illustrative embodiment, the drilling fluid is composed of an aqueous based continuous phase, a weighting agent, and a shale hydration inhibition agent. The shale hydration inhibition agent should have the general formula:

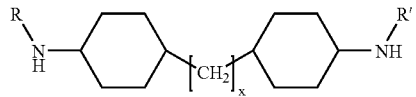

in which R and R' independently selected from hydrogen, methyl, ethyl or propyl, and X has a value from 1 to 6. The shale hydration inhibition agent is present in sufficient concentration to substantially reduce the swelling of shale drilling cuttings upon contact with the drilling fluid. The drilling fluid may be formulated to include a wide variety of components of aqueous based drilling fluids, such as weighting agents, fluid loss control agents, suspending agents, viscosifying agents, rheology control agents, as well as other compounds and materials known to one of skill in the art. The fluids may also be used in fracturing and the disposal by reinjection of drilling cutting into a selected subterranean disposal formation.

19 Claims, No Drawings

SHALE HYDRATION INHIBITION AGENT AND METHOD OF USE

BACKGROUND

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased c-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in drilling fluids. Salts generally reduce the swelling of clays. However, salts flocculate the clays resulting in both high fluid losses and an almost complete loss of thixotropy. Further, increasing salinity often decreases the functional characteristics of drilling fluid additives.

Another method for controlling clay swelling is to use organic shale inhibitor molecules in drilling fluids. It is believed that the organic shale inhibitor molecules are adsorbed on the surfaces of clays with the added organic shale inhibitor competing with water molecules for clay reactive sites and thus serve to reduce clay swelling. One reported shale inhibitor is the use of water soluble diamine compounds, such as primary diamines with a chain length of 8 or less and primary alkyl amines with a chain length of 4 or less. However, these amine compounds are less desirable at higher temperatures and pressures. Further one of skill in the art would understand that the amine compounds disclosed have a low molecular weight and thus the ratio of hydrophilic to lipophilic portions of the molecule favors the hydrophilic amine moiety. Thus compounds having a greater carbon number are not desirable because of the lipophilic nature of the molecule.

In view of the above, one of skill in the art would appreciate and understand that there remains an continuing need for new shale hydration inhibition agents within the art.

SUMMARY

Upon consideration of the present disclosure, one of skill in the art should understand and appreciate that one illustrative embodiment of the claimed subject matter includes a water-base drilling fluid for use in drilling wells through a formation containing a shale which swells in the presence of water. In such an illustrative embodiment, the drilling fluid includes, an aqueous based continuous phase, a weighting agent, and a shale hydration inhibition agent. The shale hydration inhibition agent should have the general formula:

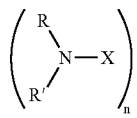

in which R and R' are independently selected from hydrogen, methyl, ethyl or propyl and X is a $C_5$ to $C_{12}$ hydrocarbon and n is an integer from 1 to 4. One illustrative shale hydration inhibition agent X is preferably the reaction product of a hydrogenation reaction of the product of the reaction of an aromatic amine with an aldehyde, preferably formaldehyde. Alternatively the shale hydration inhibition agent may be the reaction product of a hydrogenation reaction of the product of the reaction of aniline and formaldehyde. In one illustrative embodiment, the shale hydration inhibition agent is selected from compounds having the generalized structure:

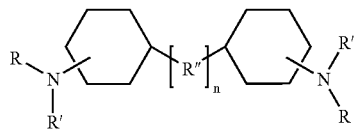

in which R and R' independently selected from hydrogen, methyl, ethyl or propyl, R" is a bridging group selected from straight chain or branched alkyl group having 1 to 6 carbon atoms and n has a value from 1 to 4. Further it should be noted that the amine group may be either in the ortho, meta or para position relative to the bridging group. The shale hydration inhibition agent is present in sufficient concentration to substantially reduce the swelling of shale drilling cuttings upon contact with the drilling fluid.

The illustrative drilling fluid is formulated such that the aqueous based continuous phase is selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected from mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may also include a wide variety of conventional components of aqueous based drilling fluids, such as fluid loss control agents, suspending agents, viscosifying agents, rheology control agents, as well as other compounds and materials that one of skill in the art would be knowledgeable about.

The scope of the claimed subject matter also encompasses a fracturing fluid for use in a subterranean well in which the subterranean well penetrates through one or more subterranean formation composed of shale that swells in the presence of water. One illustrative fluid is formulated to include an aqueous based continuous phase, a viscosifying agent and the shale hydration inhibition agents disclosed herein and which are present in sufficient concentration to substantially reduce the swelling of shale.

The scope of the claimed subject matter also encompasses water based drilling fluids which will form a semipermeable membrane over a shale formation to increase wellbore stability. This result is achieved by carefully selecting the amine and then adjusting the pH or crosslinking with other components resulting in a precipitation of the amine which then forms a membrane over the surface of the rock formation and thus stabilizing the wellbore.

It should also be appreciated that the claimed subject matter inherently includes components such as: an aqueous based continuous phase; a swellable shale material; and a shale hydration inhibition agent as substantially described herein, and present in sufficient concentration to substantially reduce the swelling of the swellable shale material. Such a composition may be formed during the course of drilling a subterranean well, but also may be deliberately made if drill cuttings reinjection is to be carried out.

One of skill in the art should appreciate that the fluids of the claimed subject matter are useful during the course of the drilling, cementing, fracturing, maintenance and production, workover, abandonment of a well and other operations associated with subterranean wells. The claimed subject matter also includes a method of disposing of drill cuttings into a subterranean formation. It should also be appreciated by one of skill in the art that the claimed subject matter inherently includes a method of reducing the swelling of shale clay in a well, the method including circulating in the well a water-base drilling fluid formulated as is substantially disclosed herein. These and other features of the claimed subject matter are more fully set forth in the following description of illustrative embodiments of the claimed subject matter.

DESCRIPTION OF ILLUSTRATIVE EMBODIMENTS

The claimed subject matter is directed to a water-base drilling fluid for use in drilling wells through a formation containing shale which swells in the presence of water. Generally the drilling fluid of the claimed subject matter may be formulated to include an aqueous continuous phase and a shale hydration inhibition agent, preferably a lipophilic amine compound. As disclosed below, the drilling fluids of the claimed subject matter may optionally include additional components, such as weighting agents, viscosity agents, fluid loss control agents, bridging agents, lubricants, anti-bit balling agents, neutralizing agents, corrosion inhibition agents, alkali reserve materials and pH buffering agents, surfactants and suspending agents, rate of penetration enhancing agents and the like that one of skill in the art should understand may be added to an aqueous based drilling fluid.

The aqueous based continuous phase may generally be any water based fluid phase that is compatible with the formulation of a drilling fluid and is compatible with the shale hydration inhibition agents disclosed herein. To solubilize the shale hydration inhibition agents disclosed herein, the amine functional group may require protonation prior to or during drilling operations to make it functionally active. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

The claimed subject matter also involves the application of lipophilic shale inhibitors to form a relatively insoluble film forming compound. Thus the lipophilic amine shale inhibitor associates itself with the shale surfaces to build an insoluble membrane.

A shale hydration inhibition agent is included in the formulation of the drilling fluids of the claimed subject matter so that the hydration of shale and shale like formations is inhibited. Thus, the shale hydration inhibition agent should be present in sufficient concentration to reduce either or both the surface hydration based swelling and/or the osmotic based swelling of the shale clay. The exact amount of the shale hydration inhibition agent present in a particular drilling fluid formulation can be determined by a trial and error method of testing the combination of drilling fluid and shale clay formation encountered. Generally however, the shale hydration inhibition agent of the claimed subject matter may be used in drilling fluids in a concentration from about 1 to about 18 pounds per barrel (lbs/bbl or ppb) and more preferably in a concentration from about 2 to about 12 pounds per barrel of drilling fluid.

As previously noted, the shale hydration inhibition agents of the claimed subject matter are preferably lipophilic amine compounds. This is in contrast with many of the compounds of the prior art which are hydrophilic (i.e. at least partially soluble in water.). One of skill in the art should note that some of the strongly lipophilic amines disclosed herein are solubilized by the partial protonation of the amine functional group. This protonation may be carried out by addition of acid or by adjusting the pH of the drilling fluid to a predetermined value. Alternatively, the shale hydration inhibition agents disclosed herein can be partially for fully protonated or neutralized prior to their application in drilling operations.

In one illustrative embodiment, the shale hydration inhibition agent of the claimed subject matter should have the general formula:

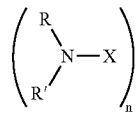

in which R and R' are independently selected from hydrogen, methyl, ethyl or propyl and X is a $C_5$ to $C_{12}$ hydrocarbon and n is an integer from 1 to 4. One illustrative amine that serves as a shale hydration inhibition agent is where X is a cyclohexyl group or other similar long chain or cyloalkyl group. In such instances the amine may be a primary, secondary or tertiary amine. For example cylcohexyl amine, N-methyl cyclohexyl amine and N,N-dimethyl cyclohexyl amine have all been found to be effective shale hydration inhibition agents.

In another illustrative shale hydration inhibition agent is preferably the reaction product of a hydrogenation reaction of the product of the reaction of an aromatic amine with an aldehyde, preferably formaldehyde. Alternatively the shale hydration inhibition agent may be the reaction product of a hydrogenation reaction of the product of the reaction of aniline and formaldehyde. In one illustrative embodiment, the shale hydration inhibition agent is selected from compounds having the generalized structure:

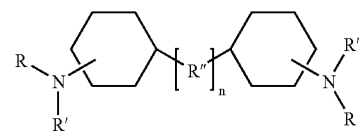

in which R and R' independently selected from hydrogen, methyl, ethyl or propyl, R" is a bridging group selected from straight chain or branched alkyl group having 1 to 6 carbon atoms and n has a value from 1 to 4. Further it should be noted that the amine group may be either in the ortho, meta or para position relative to the bridging group, however, the para position is preferred. Thus a preferred illustrative embodiment the shale hydration inhibition agent has the generalized formula:

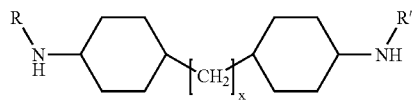

in which in which R and R' independently selected from hydrogen, methyl, ethyl or propyl, and X has a value from 1 to 6.

As shown in the above formula, the illustrative shale hydration inhibition agents are free base amines (i.e. unprotonated). One of skill in the art should appreciate that the shale hydration inhibition agents of the claimed subject matter may be partially or fully protonated depending upon the pH of the drilling fluid during or prior to use. Further it should be appreciated that the protonation state of the amine can be easily adjusted during or prior to use by simply adjusting the pH of the drilling fluid.

The drilling fluids of the claimed subject matter can include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled. Weight materials suitable for use in the formulation of the drilling fluids of the claimed subject matter may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The drilling fluids of the claimed subject matter can include a viscosifying agent in order to alter or maintain the rheological properties of the fluid. The primary purpose for such viscosifying agents is to control the viscosity and potential changes in viscosity of the drilling fluid. Viscosity control is particularly important because often a subterranean formation may have a temperature significantly higher than the surface temperature. Thus a drilling fluid may undergo temperature extremes of nearly freezing temperatures to nearly the boiling temperature of water or higher during the course of its transit from the surface to the drill bit and back. One of skill in the art should know and understand that such changes in temperature can result in significant changes in the Theological properties of fluids. Thus in order to control and/or moderate the rheology changes, viscosity agents and rheology control agents may be included in the formulation of the drilling fluid. Viscosifying agents suitable for use in the formulation of the drilling fluids of the claimed subject matter may be generally selected from any type of viscosifying agents suitable for use in aqueous based drilling fluids. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like.

In addition to the components noted above, the claimed drilling fluids may also be formulated to include materials generically referred to as alkali reserve and alkali buffering agent, pH buffering agents, gelling materials, thinners, and fluid loss control agents, as well as other compounds and materials which are optionally added to water base drilling fluid formulations. Of these additional materials, each can be added to the formulation in a concentration as rheologically and functionally required by drilling conditions.

One of skill in the art should appreciate that lime is the principle alkali reserve agent utilized in formulating water based drilling fluids. Alkali buffering agents, such as cyclic organic amines, sterically hindered amines, amides of fatty acids and the like may also be included to serve as a buffer against the loss of the alkali reserve agent. The drilling fluid may contain amine protonating or pH buffering agents to solubilize the shale inhibition agents and thus increase their activity. The drilling fluid may also contain anticorrosion agents as well to prevent corrosion of the metal components of the drilling operational equipment. Gelling materials are also often used in aqueous based drilling fluids and these include bentonite, sepiolite, clay, attapulgite clay, anionic high-molecular weight polymers and biopolymers. Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the claimed subject matter that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is preferred that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

The drilling fluid of the claimed subject matter may further contain an encapsulating agent generally selected from the group consisting of synthetic organic, inorganic and bio-polymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anionic, cationic, amphoteric, or non-ionic in nature.

Other additives that could be present in the drilling fluids of the claimed subject matter include products such as lubricants, penetration rate enhancers, defoamers, fluid loss circulation products and so forth. Such compounds should be known to one of ordinary skill in the art of formulating aqueous based drilling fluids.

The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter.

Unless otherwise stated, all starting materials are commercially available and standard laboratory techniques and equipment are utilized. The tests were conducted in accordance with the procedures in API Bulletin RP 13B-2, 1990. The following abbreviations are sometimes used in describing the results discussed in the examples:

"PV" is plastic viscosity (CPS) which is one variable used in the calculation of viscosity characteristics of a drilling fluid.

"YP" is yield point (lbs/100 ft$^2$) which is another variable used in the calculation of viscosity characteristics of drilling fluids.

"GELS" (lbs/100 ft$^1$) is a measure of the suspending characteristics and the thixotropic properties of a drilling fluid.

"F/L" is API fluid loss and is a measure of fluid loss in milliliters of drilling fluid at 100 psi.

EXAMPLE 1

The following drilling muds are formulated to illustrate the claimed subject matter:

|  | Base Mud | 1 | 2 |
| --- | --- | --- | --- |
| Fresh Water | 276 | 276 | 276 |
| Duovis | 1.0 | 1.0 | 1.0 |

-continued

|  | Base Mud | 1 | 2 |
|---|---|---|---|
| Unitrol | 3.0 | 3.0 | 3.0 |
| UltraCap | 2.0 | 2.0 | 2.0 |
| 4,4'-diaminodicyclohexylmethane | — | 10.5 | — |
| Cyclohexylamine | — | — | 10.5 |
| Barite | 201 | 201 | 201 |
| pH Adjusted (Acetic Acid) | 9.4 | 9.4 | 9.4 |

In the above mud formulation the following commercially available compounds have been used in the formulation of the drilling fluid, but one of skill in the art should appreciate that other similar compounds may be used instead.

| UltraCap | M-I SWACO, Houston TX |
| UltraFree | M-I SWACO, Houston TX |
| Unitrol | M-I SWACO, Houston TX |
| DuoVis | Kelco Oil Field Group |

The properties of the above muds as well as a base mud (i.e. a mud in which there is no shale hydration inhibition agent) are measured and give the following exemplary data:

| Properties | Base Mud | 1 | 2 |
|---|---|---|---|
| Viscosity (cps) at Ambient Temperature | | | |
| 600 rpm | 136 | 115 | 109 |
| 300 rpm | 101 | 84 | 76 |
| 200 rpm | 85 | 74 | 63 |
| 100 rpm | 58 | 48 | 43 |
| 6 rpm | 16 | 13 | 12 |
| 3 rpm | 11 | 10 | 10 |
| Gels  10 sec. | 12 | 12 | 12 |
|        10 min. | 16 | 14 | 13 |
| PV | 35 | 31 | 33 |
| YP | 66 | 53 | 43 |
| API F/L | 3.8 | 3.0 | 3.2 |

Dispersion tests are run with Oxford Clay cuttings by hot rolling 10 g of cuttings in a one-barrel equivalent of mud for 16 hours at 150° F. After hot rolling the remaining cuttings are screened using a 20 mesh screen and washed with 10% potassium chloride water, dried and weighed to obtain the percentage recovered. The results of this evaluation are given in the following Table and shows the improved shale inhibition performance of shale hydration inhibition agent of this invention.

| (% cuttings recovered) | Base Mud | 1 | 2 |
|---|---|---|---|
| Oxford Clay | 88 | 98 | 94 |

To further demonstrate the performance of the drilling fluids formulated in accordance with the teachings of this invention, a test using a bulk hardness tester is conducted. A BP Bulk Hardness Tester is a device designed to give an assessment of the hardness of shale cuttings exposed to drilling fluids, which in turn can be related to the inhibiting properties of the drilling fluid being evaluated. In this test, shale cuttings are hot rolled in the test drilling fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the drilling fluid used, a plateau region in torque is reached as extrusion of the cuttings begins to take place. Alternatively, the torque may continue to rise which tends to occur with harder cutting samples. Therefore, the higher the torque number obtained, the more inhibitive the drilling fluid system is considered. Illustrative data obtained using the three different mud formulations with Oxford clay cuttings are given below.

| Oxford Clay | Bulk Hardness: (values in inch/lbs) Mud Formulation | | |
|---|---|---|---|
| Turn No. | Base Mud | 1 | 2 |
| 3 | — | 5 | — |
| 4 | — | 10 | 5 |
| 5 | 5 | 15 | 5 |
| 6 | 5 | 30 | 10 |
| 7 | 10 | 50 | 15 |
| 8 | 10 | 95 | 40 |
| 9 | 10 | 190 | 100 |
| 10 | 10 | 225 | 120 |
| 11 | 10 | D | 135 |
| 12 | 15 | | 150 |
| 13 | 15 | | 165 |
| 14 | 15 | | 170 |
| 15 | 15 | | 190 |
| 16 | 15 | | 200 |
| 17 | 20 | | 225 |
| 18 | 25 | | R, D |
| 19 | 225 | | |
|  | R | | |

In the above table, D indicates formation of a disk; R indicates the formation of spaghetti like ribbons.

Upon review of the above data, one skilled in the art should observe that drilling fluids formulated according to the teachings of this invention prevent the hydration of various types of shale clays and thus are likely to provide good performance in drilling subterranean wells encountering such shale clays.

EXAMPLE 2

The following testing was conducted to demonstrate the maximum amount of API bentonite that can be inhibited by a single 10.5 ppb treatment of shale hydration inhibition agents of the claimed subject matter over a period of days. This test procedure uses pint jars that are filed with one barrel equivalent of tap water and 10.5 ppb of a shale hydration inhibition agent. Tap water was used as a control sample. All samples were adjusted to at least a pH of 9.5 with hydrochloric acid and treated with a 10 ppb portion of M-I GEL (API bentonite) at a medium sheer rate. After stirring for 30 minutes, the samples were heat aged overnight at 150° F. After the samples were cooled, their rheologies were recorded at ambient temperature. This procedure was carried out for each sample until all were too thick to measure. The tables below present representative data that shows the shale hydration inhibition effect of the claimed subject matters by the daily addition of bentonite in tap water treated with the shale hydration inhibition agents indicated at the top of each column. For purposes of the following example, the following shale hydration inhibition agents are utilized:

| Additive Code | Chemical |
|---|---|
| A | 4,4'-diaminodicyclohexylmethane |
| B | Cylcohexylamine (CHA) |
| C | N-methyl cyclohexylamine |
| D | N,N-dimethyl cyclohexylamine |

600 rpm Rheology Data (Centipoises)

| Bentonite (llb/bbl) | Base | KCl | Choline Chloride | A | B | C | D |
|---|---|---|---|---|---|---|---|
| 50 | TTTM | 20 | 3 | 6 | 7 | 6 | 8 |
| 70 | | 170 | 24 | 9 | 12 | 8 | 10 |
| 90 | | TTTM | 85 | 12 | 14 | 13 | 14 |
| 110 | | | TTTM | 17 | 18 | 21 | 25 |
| 130 | | | | 27 | 29 | 29 | 35 |
| 150 | | | | 47 | 47 | 36 | 48 |
| 170 | | | | 67 | 54 | 71 | 113 |
| 190 | | | | 139 | 102 | 97 | 143 |
| 200 | | | | 165 | 123 | 103 | 250 |
| 210 | | | | 254 | 160 | 109 | TTTM |
| 220 | | | | TTTM | 201 | 157 | |
| 230 | | | | | TTTM | 277 | |
| 240 | | | | | | TTTM | |

In the above table the abbreviation TTTM means too thick to measure.

6 rpm Rheology Data (Centipoises)

| Bentonite (llb/bbl) | Base | KCl | Choline Chloride | A | B | C | D |
|---|---|---|---|---|---|---|---|
| 50 | TTTM | 12 | 3 | 1 | 1 | 1 | 2 |
| 70 | | 140 | 13 | 2 | 2 | 2 | 2 |
| 90 | | TTTM | 32 | 2 | 2 | 2 | 3 |
| 110 | | | TTTM | 3 | 5 | 4 | 6 |
| 130 | | | | 7 | 8 | 8 | 9 |
| 150 | | | | 19 | 13 | 12 | 17 |
| 170 | | | | 21 | 18 | 17 | 34 |
| 190 | | | | 46 | 32 | 24 | 36 |
| 200 | | | | 53 | 36 | 25 | 41 |
| 210 | | | | 77 | 47 | 26 | 131 |
| 220 | | | | TTTM | 60 | 47 | TTTM |
| 230 | | | | | 161 | 98 | |
| 240 | | | | | TTTM | TTTM | |

In the above table the abbreviation TTTM means too thick to measure.

10 Min. Gels

| Bentonite (llb/bbl) | Base | KCl | Choline Chloride | A | B | C | D |
|---|---|---|---|---|---|---|---|
| 50 | TTTM | 24 | 2 | 2 | 2 | 2 | 2 |
| 70 | | 297 | 9 | 2 | 2 | 3 | 3 |
| 90 | | TTTM | 31 | 2 | 3 | 3 | 3 |
| 110 | | | TTTM | 6 | 5 | 4 | 5 |
| 130 | | | | 7 | 6 | 8 | 9 |
| 150 | | | | 13 | 10 | 8 | 14 |
| 170 | | | | 18 | 14 | 12 | 23 |
| 190 | | | | 39 | 25 | 18 | 34 |
| 200 | | | | 52 | 31 | 25 | 83 |
| 210 | | | | 86 | 37 | 28 | 129 |
| 220 | | | | TTTM | 62 | 47 | TTTM |

-continued

| Bentonite (llb/bbl) | Base | KCl | Choline Chloride | A | B | C | D |
|---|---|---|---|---|---|---|---|
| 230 | | | | | | 168 | 119 |
| 240 | | | | | | TTTM | TTTM |

In the above table the abbreviation TTTM means too thick to measure.

Plastic Viscosity

| Bentonite (llb/bbl) | Base | KCl | Choline Chloride | A | B | C | D |
|---|---|---|---|---|---|---|---|
| 50 | TTTM | 7 | 3 | 3 | 4 | 3 | 4 |
| 70 | | 20 | 5 | 4 | 6 | 3 | 4 |
| 90 | | TTTM | 20 | 5 | 5 | 5 | 6 |
| 110 | | | TTTM | 6 | 6 | 8 | 8 |
| 130 | | | | 10 | 10 | 9 | 8 |
| 150 | | | | 12 | 17 | 8 | 9 |
| 170 | | | | 12 | 14 | 16 | 17 |
| 190 | | | | 21 | 25 | 20 | 45 |
| 200 | | | | 30 | 32 | 27 | 50 |
| 210 | | | | 56 | 44 | 33 | TTTM |
| 220 | | | | TTTM | 53 | 53 | |
| 230 | | | | | TTTM | 55 | |
| 240 | | | | | | TTTM | |

In the above table the abbreviation TTTM means too thick to measure.

Yield Point

| Bentonite (llb/bbl) | Base | KCl | Choline Chloride | A | B | C | D |
|---|---|---|---|---|---|---|---|
| 50 | TTTM | 8 | 4 | 0 | 0 | 0 | 0 |
| 70 | | 132 | 12 | 1 | 0 | 2 | 2 |
| 90 | | TTTM | 65 | 2 | 4 | 3 | 2 |
| 110 | | | TTTM | 5 | 6 | 5 | 9 |
| 130 | | | | 7 | 7 | 11 | 19 |
| 150 | | | | 23 | 17 | 20 | 30 |
| 170 | | | | 43 | 26 | 39 | 79 |
| 190 | | | | 97 | 52 | 57 | 53 |
| 200 | | | | 105 | 59 | 51 | 59 |
| 210 | | | | 142 | 72 | 40 | TTTM |
| 220 | | | | TTTM | 95 | 51 | |
| 230 | | | | | TTTM | 167 | |
| 240 | | | | | | TTTM | |

In the above table the abbreviation TTTM means too thick to measure.

Upon review of the above representative data, one of skill in the art should observe that drilling fluids formulated according to the teachings of the disclosure substantially inhibit the hydration of various shale clays and thus are likely to provide good performance in drilling subterranean wells encountering such shale clays.

EXAMPLE 3

In this example, 3% by weight of 4,4'-dimethyldicyclohexylmethane was dissolved into 1.5% glacial acetic acid solution in distilled water. A clear solution formed upon stirring the mixture. To this resulting solution a sufficient amount of 1.0 N sodium hydroxide was added to bring the pH to about 10.5. A white precipitate formed at this pH. The precipitate could be redissolved upon adjusting the pH to about 9.5.

The above example illustrates that a preferred shale hydration inhibition agent of the present disclosure can be precipitated out of solution and onto shale surfaces by adjusting the pH. One of skill in the art should appreciate that the ability to form this precipitate will prompt the formation of a membrane that should enhance well stability.

In view of the above disclosure, one of skill in the art should understand and appreciate that one illustrative embodiment of the claimed subject matter includes a water-base drilling fluid for use in drilling wells through a formation containing a shale which swells in the presence of water. In such an illustrative embodiment, the drilling fluid includes an aqueous based continuous phase, a weighting agent, and a shale hydration inhibition agent having the generalized structural formula:

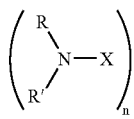

in which R and R' are independently selected from hydrogen, methyl, ethyl or propyl and X is a $C_5$ to $C_{12}$ hydrocarbon and n is an integer from 1 to 4. Preferably the shale inhibition agent is a reaction product of a hydrogenation reaction of the product of the reaction of an aromatic amine with an aldehyde, preferably formaldehyde. Alternatively the shale hydration inhibition agent may be the reaction product of a hydrogenation reaction of the product of the reaction of aniline and formaldehyde. In one illustrative embodiment, the shale hydration inhibition agent is selected from compounds having the generalized structure:

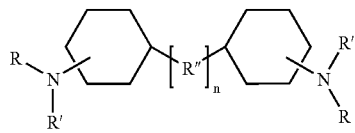

in which R and R' independently selected from hydrogen, methyl, ethyl or propyl, R" is a bridging group selected from straight chain or branched alkyl group having 1 to 6 carbon atoms and n has a value from 1 to 4. Further it should be noted that the amine group may be either in the meta or para position relative to the bridging group, however, the para position is preferred. Thus a preferred illustrative embodiment the shale hydration inhibition agent has the generalized formula:

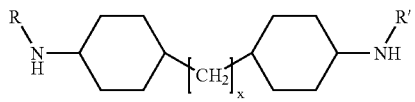

in which in which R and R' independently selected from hydrogen, methyl, ethyl or propyl, and X has a value from 1 to 6.

The illustrative drilling fluid is formulated such that the aqueous based continuous phase is selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may also include a wide variety of conventional components of aqueous based drilling fluids, such as fluid loss control agents, suspending agents, viscosifying agents, rheology control agents, pH buffering agents, as well as other compounds and materials that one of skill in the art would be knowledgeable about.

The scope of the claimed subject matter also encompasses a fracturing fluid for use in a subterranean well in which the subterranean well penetrates through one or more subterranean formations composed of shale that swells in the presence of water. One illustrative fluid is formulated to include an aqueous based continuous phase, a viscosifying agent and a shale hydration inhibition agent which is present in sufficient concentration to substantially reduce the swelling of shale. In one illustrative embodiment, the shale hydration inhibition agent has the formula:

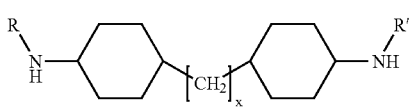

in which R and R' independently selected from hydrogen, methyl, ethyl or propyl, and X has a value from 1 to 6. The illustrative fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may also include a wide variety of conventional components of fracturing fluids, such as propants such as sand, gravel, glass beads, ceramic materials and the like, acid release agents, fluid loss control agents, suspending agents, viscosifying agents, rheology control agents, pH buffering agents, as well as other compounds and materials that one of skill in the art would be knowledgeable about.

One of skill in the art should appreciate that the fluids of the claimed subject matter are useful during course of the drilling, cementing, fracturing, maintenance and production, workover, abandonment of a well or other operations associated with subterranean wells. In one illustrative embodiment, the fluids are utilized in a method involving the drilling a subterranean well through one or more subterranean formations containing a shale which swells in the presence of water. The illustrative method is carried out using conventional drilling means and techniques; however, the drilling fluid utilized is formulated to include: an aqueous based continuous phase; a weighting agent; and a shale hydration inhibition agent present in sufficient concentration to reduce the swelling of shale. In one illustrative embodiment, the shale hydration inhibition agent has the formula:

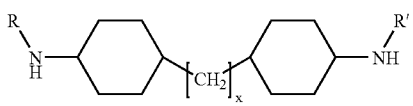

in which R and R' independently selected from hydrogen, methyl, ethyl or propyl, and X has a value from 1 to 6. The illustrative drilling fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative drilling fluid. The illustrative drilling fluid may also include a wide variety of conventional components of drilling and well bore fluids, such as fluid loss control agents, suspending agents, viscosifying agents, rheology control agents, pH buffering agents, as well as other compounds and materials that one of skill in the art would be knowledgeable about.

The claimed subject matter also includes a method of disposing of drill cuttings into a subterranean formation. As should be well known to one of skill in the art, this involves grinding the drill cuttings, which have been previously separated from the recirculating drilling fluid, in the presence of a fluid to form a slurry. The slurry is then injected by way of a well into a suitable subterranean formation for disposal. With this in mind a person of skill should appreciate that one illustrative embodiment of the claimed subject matter includes: grinding drill cuttings in a water-base fluid to form a slurry, in which the water based fluid is formulated to include: an aqueous based continuous phase and a shale hydration inhibition agent present in sufficient concentration to substantially reduce the swelling of the shale and then injecting the slurry into the subterranean formation designated for disposal of the cuttings. The shale hydration inhibition agent utilized in the formulation of the fluid is that which is substantive described above. That is to say the shale hydration inhibition agent utilized in one embodiment of the illustrative method has the formula:

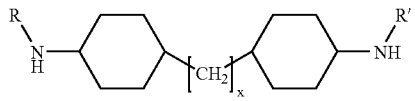

in which R and R' independently selected from hydrogen, methyl, ethyl or propyl, and X has a value from 1 to 6. The illustrative fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may optionally include a wide variety of conventional components of drilling and well bore fluids, such as fluid loss control agents, suspending agents, viscosifying agents, rheology control agents, pH buffering agents, as well as other compounds and materials that one of skill in the art would be knowledgeable about.

It should also be appreciated by one of skill in the art that the claimed subject matter inherently includes a method of reducing the swelling of shale clay in a well comprising circulating in the well a water-base drilling fluid formulated as is substantially disclosed herein. One such illustrative fluid includes: an aqueous based continuous phase and a shale hydration inhibition agent present in sufficient concentration to reduce the swelling of the shale. That is to say the shale hydration inhibition agent utilized in one embodiment of the illustrative method has the formula:

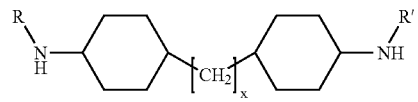

in which R and R' independently selected from hydrogen, methyl, ethyl or propyl, and X has a value from 1 to 6. The illustrative fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may optionally include a wide variety of conventional components of drilling and well bore fluids, such as fluid loss control agents, suspending agents, viscosifying agents, rheology control agents, pH buffing agents as well as other compounds and materials that one of skill in the art would be knowledgeable about.

One of skill in the art should appreciate that a broad class of potential compounds exist that may be useful as described herein and thus within the scope of the claimed subject matter. This broader aspect of the present invention includes monoamine compounds having substantial lipophilic character. In one such illustrative embodiment a water-base drilling fluid for use in drilling a subterranean well through one or more subterranean formations containing a shale which swells in the presence of water, is formulated to include: an aqueous based continuous phase; and a shale hydration inhibition agent having the formula:

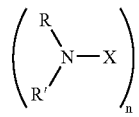

in which R and R' are independently selected from hydrogen, methyl, ethyl or propyl and X is a $C_5$ to $C_{12}$ hydrocarbon and n is an integer from 1 to 4. As previously noted, the shale hydration inhibition agent should be present in sufficient concentration to reduce the swelling of shale. The illustrative fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may optionally include a wide variety of conventional components of drilling and well bore fluids, such as fluid loss control agents, suspending agents, viscosifying agents, rheology control agents, pH buffing agents as well as other compounds and materials that one of skill in the art would be knowledgeable about.

It should further be noted that the water based drilling fluids disclosed herein may be capable of forming a membrane through in-situ precipitation or polymerization, One such illustrative fluid may include an aqueous continuous phase; and, a shale hydration inhibition agent having the formula:

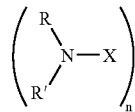

in which R and R' are independently selected from hydrogen, methyl, ethyl or propyl and X is a $C_5$ to $C_{12}$ hydrocarbon and n is an integer from 1 to 4. As previously noted, the shale hydration inhibition agent should be present in sufficient concentration to reduce the swelling of shale. The illustrative fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may optionally include a wide variety of conventional components of drilling and well bore fluids, such as fluid loss control agents, suspending agents, viscosifying agents, rheology control agents, pH buffing agents as well as other compounds and materials that one of skill in the art would be knowledgeable about.

One of skill in the art should also appreciate that the illustrative fluid may be used in a method of increasing shale formation stability with a water-based drilling fluid. For example, the method may include delivering the water-based drilling fluid to the shale formation, wherein the drilling fluid comprises an aqueous continuous phase; and, a shale hydration inhibition agents having the formula:

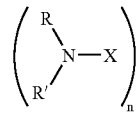

in which R and R' are independently selected from hydrogen, methyl, ethyl or propyl and X is a $C_5$ to $C_{12}$ hydrocarbon and n is an integer from 1 to 4; and wherein the shale hydration inhibition agent is present in sufficient concentration to form an osmotic membrane on the shale formation.

In a similar manner, the present disclosure also teaches the desirability and use of water-base drilling fluid that generically utilize diamine compounds as a shale hydration inhibition agent. One such illustrative embodiment includes a drilling fluid that may be formulated to include an aqueous based continuous phase; and a shale hydration inhibition agent having the formula:

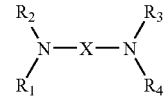

in which $R_1$ $R_2$ $R_3$ $R_4$ are independently selected from hydrogen, methyl ethyl or propyl groups and X is an aliphatic hydrocarbon of about 7 to about 20 carbon atoms. As previously noted, the shale hydration inhibition agent should be present in sufficient concentration to reduce the swelling of shale. The illustrative fluid is formulated such that the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may also be included into the formulation of the illustrative fluid. The illustrative fluid may optionally include a wide variety of conventional components of drilling and well bore fluids, such as fluid loss control agents, suspending agents, viscosifying agents, rheology control agents, pH buffing agents as well as other compounds and materials that one of skill in the art would be knowledgeable about.

While the compositions and methods of this claimed subject matter have been described in terms of preferred embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the claimed subject matter as it is set out in the following claims.

What is claimed is:

1. A water-base drilling fluid for use in drilling a subterranean well through one or more subterranean formations containing a shale which swells in the presence of water, wherein the drilling fluid comprises:
    an aqueous based continuous phase;
    a weighting material selected from the group consisting of barite, calcite, hematite, iron oxide, calcium carbonate, and mixtures thereof; and
    a shale hydration inhibition agent having the formula:

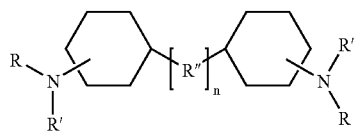

in which R and R' independently selected from hydrogen, methyl, ethyl or propyl, R" is a bridging group selected from straight chain or branched alkyl group having 1 to 6 carbon atoms and n has a value from 1 to 4; and
wherein the shale hydration inhibition agent is present in sufficient concentration to reduce the swelling of shale.

2. A water-base drilling fluid for use in drilling a subterranean well through one or more subterranean formations containing a shale which swells in the presence of water, wherein the drilling fluid comprises:
    an aqueous based continuous phase; and
    a shale hydration inhibition agent having the formula:

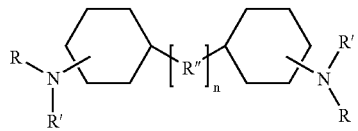

in which R and R' independently selected from hydrogen, methyl, ethyl or propyl, R" is a bridging group selected from straight chain or branched alkyl group having 1 to 6 carbon atoms and n has a value from 1 to 4;
wherein the shale hydration inhibition agent is present in sufficient concentration to reduce the swelling of shale; and
wherein at least one of the amine functional groups is protonated.

3. A water-base drilling fluid for use in drilling a subterranean well through one or more subterranean formations containing a shale which swells in the presence of water, the drilling fluid comprising:
    an aqueous based continuous phase;
    a viscosifying agent;
    a weighting agent; and
    a shale hydration inhibition agent having the formula:

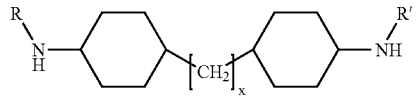

wherein R and R' independently selected from hydrogen, methyl, ethyl or propyl, and X has a value from 1 to 6; and
wherein the shale hydration inhibition agent is present in sufficient concentration to reduce the swelling of shale.

4. The water-base drilling fluid of claim 3 wherein the weighting material is selected from the group consisting of barite, calcite, hematite, iron oxide, calcium carbonate, organic and inorganic salts, and mixtures thereof.

5. A water-base drilling fluid for use in drilling a subterranean well through one or more subterranean formations containing a shale which swells in the presence of water, the drilling fluid comprising:
    an aqueous based continuous phase;
    a weighting agent; and
    a shale hydration inhibition agent having the formula:

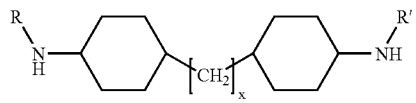

wherein R and R' independently selected from hydrogen, methyl, ethyl or propyl, and X has a value from 1 to 6;
    wherein the shale hydration inhibition agent is present in sufficient concentration to reduce the swelling of shale; and
    wherein at least one of the amine functional groups is protonated.

6. A fracturing fluid for use in a subterranean well through one or more subterranean formations containing a shale which swells in the presence of water, the fluid comprising:
    an aqueous based continuous phase;
    a viscosifying agent and
    a shale hydration inhibition agent having the formula:

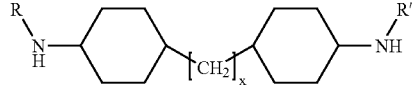

wherein R and R' independently selected from hydrogen, methyl, ethyl or propyl, and X has a value from 1 to 6; and
wherein the shale hydration inhibition agent is present in sufficient concentration to reduce the swelling of shale.

7. The composition of claim 6 further comprising a propant material.

8. The composition of claim 6 further comprising a weighting material selected from the group consisting of barite, calcite, hematite, iron oxide, calcium carbonate, organic and inorganic salts, and mixtures thereof.

9. A method comprising
drilling a subterranean well through one or more subterranean formations containing a shale which swells in the presence of water, wherein the drilling is carried out using a drilling fluid including:
an aqueous based continuous phase;
a weighting agent; and
a shale hydration inhibition agent having the formula:

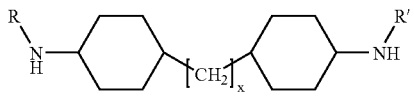

wherein R and R' independently selected from hydrogen, methyl, ethyl or propyl, and X has a value from 1 to 6; and
wherein the shale hydration inhibition agent is present in sufficient concentration to reduce the swelling of shale.

10. The method of claim 9 wherein the weighting agent is selected from the group consisting of barite, calcite, hematite, iron oxide, calcium carbonate, organic and inorganic salts, and mixtures thereof.

11. A method of disposing of drill cuttings into a subterranean formation, the method comprising:
grinding the drill cuttings in a water-base fluid to form a slurry, wherein the water based fluid includes:
an aqueous based continuous phase and
a shale hydration inhibition agent having the formula:

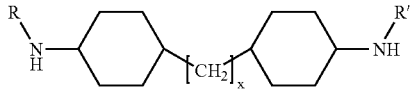

wherein R and R' independently selected from hydrogen, methyl, ethyl or propyl, and X has a value from 1 to 6; and
wherein the shale hydration inhibition agent is present in sufficient concentration to reduce the swelling of shale, and
injecting the slurry into the subterranean formation.

12. The method of claim 11 wherein the shale hydration inhibition agent is 4,4'-diaminodicyclohexyl methane.

13. The method of claim 11 wherein at least one of the amine functional groups is protonated.

14. The method of claim 11 wherein the aqueous based continuous phase is selected from: fresh water, sea water, brine, and water soluble organic compounds and mixtures thereof.

15. A method of reducing the swelling of shale clay in a well comprising circulating in the well a water-base drilling fluid comprising:
an aqueous based continuous phase and
a shale hydration inhibition agent having the formula:

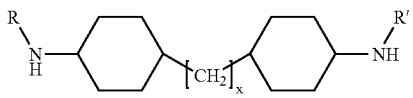

wherein R and R' independently selected from hydrogen, methyl, ethyl or propyl, and X has a value from 1 to 6; and
wherein the shale hydration inhibition agent is present in sufficient concentration to reduce the swelling of shale, and
injecting the slurry into the subterranean formation.

16. The method of claim 15 wherein the shale hydration inhibition agent is 4,4'-diaminodicyclohexyl methane.

17. The method of claim 15 wherein at least one of the amine functional groups is protonated.

18. The method of claim 15 wherein the aqueous based continuous phase is selected from: fresh water, sea water, brine, and water soluble organic compounds and mixtures thereof.

19. A method of increasing shale formation stability with a water-based drilling fluid, the method comprising:
delivering the water-based drilling fluid to the shale formation, wherein the drilling fluid comprises an aqueous continuous phase; and, a shale hydration inhibition agents having the formula:

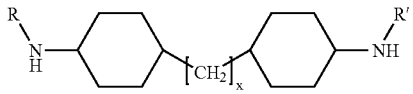

wherein R and R' independently selected from hydrogen, methyl, ethyl or propyl, and X has a value from 1 to 6; and
wherein the shale hydration inhibition agent is present in sufficient concentration to form an osmotic membrane on the shale formation.

* * * * *